US011863728B2

(12) United States Patent
Akimoto et al.

(10) Patent No.: US 11,863,728 B2
(45) Date of Patent: Jan. 2, 2024

(54) IMAGING SYSTEM AND MONITORING SYSTEM WITH TRAINING DATA THAT INCLUDES A COLOR PICTURE IMAGE AND A COLOR ANIMATION IMAGE

(71) Applicant: Semiconductor Energy Laboratory Co., Ltd., Atsugi (JP)

(72) Inventors: Kengo Akimoto, Isehara (JP); Seiko Inoue, Atsugi (JP); Daichi Mishima, Hadano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/764,622

(22) PCT Filed: Sep. 29, 2020

(86) PCT No.: PCT/IB2020/059072
§ 371 (c)(1),
(2) Date: Mar. 29, 2022

(87) PCT Pub. No.: WO2021/070000
PCT Pub. Date: Apr. 15, 2021

(65) Prior Publication Data
US 2022/0417390 A1 Dec. 29, 2022

(30) Foreign Application Priority Data
Oct. 11, 2019 (JP) .................. 2019-187705

(51) Int. Cl.
*H04N 1/60* (2006.01)
(52) U.S. Cl.
CPC ............... *H04N 1/6086* (2013.01)

(58) Field of Classification Search
CPC ........ H04N 1/6086; H04N 25/46; H04N 9/43; H04N 23/617; H04N 23/84; H04N 1/465; G06V 10/82; G06T 1/00
See application file for complete search history.

(56) References Cited

U.S. PATENT DOCUMENTS 8,378,391 B2   2/2013   Koyama et al.
8,780,034 B2   7/2014   Kimura
(Continued)

FOREIGN PATENT DOCUMENTS

JP   2007-208481 A   8/2007
JP   2010-262276 A   11/2010
(Continued)

OTHER PUBLICATIONS

Kobayashi.Y et al., "A Method for Transferring Color to Grayscale Images", The Journal of The Institute of Image Information and Television Engineers, May 1, 2005, vol. 59, No. 5, pp. 769-775, The Institute of Image Information and Television Engineers.
(Continued)

*Primary Examiner* — Christopher Wait
(74) *Attorney, Agent, or Firm* — ROBINSON INTELLECTUAL PROPERTY LAW OFFICE, P.C.; Eric J. Robinson

(57) ABSTRACT

Color filters are used for color images obtained using imaging devices such as conventional image sensors. Imaging elements with color filters are sold, and an appropriate combination of the imaging element and a lens or the like is incorporated in an electronic device. Only providing a color filter to overlap a light-receiving region of an image sensor reduces the amount of light reaching the light-receiving region. An imaging system of the present invention includes a solid-state imaging element without a color filter, a storage device, and a learning device. Since the color filter is not included, colorization is performed on obtained mono-
(Continued)

chrome image data (analog data), and coloring is performed using an AI system.

6 Claims, 11 Drawing Sheets

(56) References Cited

U.S. PATENT DOCUMENTS

| | | |
|---|---|---|
| 8,916,869 B2 | 12/2014 | Koyama et al. |
| 9,331,112 B2 | 5/2016 | Koyama et al. |
| 9,343,018 B2 | 5/2016 | Kimura |
| 9,773,814 B2 | 9/2017 | Koyama et al. |
| 9,773,832 B2 | 9/2017 | Kurokawa |
| 9,978,320 B2 | 5/2018 | Kimura |
| 10,074,687 B2 | 9/2018 | Kurokawa |
| 10,600,839 B2 | 3/2020 | Kurokawa |
| 10,657,910 B2 | 5/2020 | Kimura |
| 10,964,743 B2 | 3/2021 | Kurokawa |
| 11,030,966 B2 | 6/2021 | Kimura |
| 11,302,726 B2 | 4/2022 | Kobayashi et al. |
| 2020/0226457 A1 | 7/2020 | Ikeda et al. |
| 2020/0382730 A1 | 12/2020 | Kurokawa et al. |
| 2021/0112261 A1* | 4/2021 | Hwang ............... H04N 19/186 |
| 2021/0233952 A1 | 7/2021 | Kurokawa |
| 2021/0366421 A1 | 11/2021 | Kimura |

FOREIGN PATENT DOCUMENTS

| | | | |
|---|---|---|---|
| JP | 2011-119711 A | | 6/2011 |
| JP | 2016-123087 A | | 7/2016 |
| JP | 2019-117559 A | | 7/2019 |
| JP | 2019-128889 A | | 8/2019 |
| JP | 2019128889 A | * | 8/2019 |

OTHER PUBLICATIONS

Ohya.T et al., "Basic study of learning based automatic colorization of luminance image", PCSJ(Picture Coding Symposium of Japan), Nov. 18, 2015, pp. 52-53.

International Search Report (Application No. PCT/IB2020/059072) dated Dec. 8, 2020.

Written Opinion (Application No. PCT/IB2020/059072) dated Dec. 8, 2020.

* cited by examiner

from keras.models import Sequential from keras.layers import Dense,Activation,Convolution2D,Input from keras.models import Model import numpy as np import cv2
```

FIG. 3

```
In [X]:
def conv2d(layer_input,filters,f_size=4):
    d=ConvSN2D(filters,kernel_size=f_size,strides=2,padding='same')(layer_input)
    d=LeakyReLU(alpha=0.2)(d)
    return d def deconv2d(layer_input,skip_input,filters,f_size=4,dropout_rate=0):
    u=UpSampling2D(size=2)(layer_input)
    u=ConvSN2D(filters,kernel_size=f_size,strides=1,padding='same',activation='relu')(u)
    u=Dropout(dropout_rate)(u)
    u=Concatenate()([u,skip_input])
    return d d1=Input(shape=(width,height,channels))
d2=conv2d(d1,128)
d3=conv2d(d2,256)
d4=conv2d(d3,512)
d5=conv2d(d4,512)
d6=conv2d(d5,512)
d7=conv2d(d6, 512)

u1=deconv2d(d7,d6, 512)
u2=deconv2d(u1,d5, 512)
u3=deconv2d(u2,d4,512)
u4=deconv2d(u3,d3,256)
u4_att=Attention(512)(u4)
u5=deconv2d(u4_att,d2,self.gf*2)
u6=UpSampling2D(size=2)(u5)
output=ConvSN2D(2,kernel_size=(7,7),strides=1,padding='same',activation='tanh')(u6)

model=Model(d1,output)
```

FIG. 8A

|  |  |  |
|---|---|---|
| −1 | −1 | −1 |
| −1 | 8 | −1 |
| −1 | −1 | −1 |

FIG. 8B

|  |  |  |
|---|---|---|
| −1 | −1 | −1 |
| 0 | 0 | 0 |
| 1 | 1 | 1 |

FIG. 8C

|  |  |  |
|---|---|---|
| −1 | −2 | −1 |
| 0 | 0 | 0 |
| 1 | 2 | 1 |

FIG. 10

In [Y1]:
```
from keras.models import Sequential
from keras.layers import Dense,Activation,Convolution2D,Input
from keras.models import Model
import numpy as np
from scipy import misc
```

In [Y2]
```
model = Sequential()
input_shape=(33,33,1)
model.add(Convolution2D(8,3,3,border_mode='valid',input_shape=input_shape,activation='relu',name='conv1'))
model.add(Convolution2D(64,9,9,border_mode='valid',activation='relu',name='conv2'))
model.add(Convolution2D(32,1,1,border_mode='valid',activation='relu',name='conv3'))
model.add(Convolution2D(1,5,5,name='output'))
model.compile(Adam(lr=0.001),'mse')
```

In [Y3]
```
scale = 3.0
resizedimage = misc.imresize(image, 1.0/scale, 'bicubic')
```

IMAGING SYSTEM AND MONITORING SYSTEM WITH TRAINING DATA THAT INCLUDES A COLOR PICTURE IMAGE AND A COLOR ANIMATION IMAGE

TECHNICAL FIELD

One embodiment of the present invention relates to a neural network and an imaging system using the neural network. Another embodiment of the present invention relates to an electronic device using a neural network. Another embodiment of the present invention relates to a vehicle using a neural network. Another embodiment of the present invention relates to an imaging system that obtains a color image by using an image processing technique from a monochrome image obtained in a solid-state imaging element. Another embodiment of the present invention relates to a video monitoring system or a security system using the imaging system, or a safety information service system.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Therefore, specific examples of the technical field of one embodiment of the present invention disclosed in this specification and the like include a semiconductor device, a display device, a light-emitting device, a power storage device, a storage device, an electronic device, a lighting device, an input device, an input/output device, a driving method thereof, and a manufacturing method thereof.

Note that in this specification, a semiconductor device refers to any device that can function by utilizing semiconductor characteristics, and an electro-optical device, a semiconductor circuit, and an electronic device are all semiconductor devices.

BACKGROUND ART

A technique for performing colorization on an image taken by an image sensor by using a color filter has been conventionally known. Image sensors have been widely used as components of digital cameras, video cameras, and the like for imaging. In addition, image sensors are also used as part of security equipment such as security cameras; therefore, such equipment needs to perform accurate imaging not only in a bright place during the day but also a dark place at night or with low lighting and poor light, and the image sensors need to have wide dynamic range.

In addition, considerable progress in techniques using AI (Artificial Intelligence) has been made, and for example, automatic coloring techniques where monochrome pictures using old photographic films are subjected to colorization by AI have been actively developed. For example, a technique where learning is performed using high-volume data to create a model and colorization is achieved by inference using the obtained generative model has been known as colorization by AI. Note that machine learning is part of AI.

A technique for forming a transistor by using an oxide semiconductor thin film formed over a substrate has attracted attention. For example, an imaging device with a structure in which a transistor that includes an oxide semiconductor and has an extremely low off-state current is used in a pixel circuit is disclosed in Patent Document 1.

In addition, a technique for adding an arithmetic function to an imaging device is disclosed in Patent Document 2. Furthermore, a technique related to super-resolution processing is disclosed in Patent Document 3.

REFERENCES

Patent Documents

[Patent Document 1] Japanese Published Patent Application No. 2011-119711
[Patent Document 2] Japanese Published Patent Application No. 2016-123087
[Patent Document 3] Japanese Published Patent Application No. 2010-262276

SUMMARY OF THE INVENTION

Problems to be Solved by the Invention

Color filters are used for color images obtained using imaging devices such as conventional image sensors. Imaging elements with color filters are sold, and an appropriate combination of the imaging element and a lens or the like is incorporated in an electronic device. Only providing a color filter to overlap a light-receiving region of an image sensor reduces the amount of light reaching the light-receiving region. Accordingly, attenuation of the amount of received light by the color filter is inevitable. Different companies combine a variety of color filters with imaging elements for optimization. Transmitted light with a specific wavelength is not acquired, but broad light in a certain wavelength region is received.

For example, in a security camera used for a monitoring system or the like, the amount of light is insufficient during image taking in dim light; thus, there is a problem in that an image where a face can be recognized cannot be obtained. A person who sets the security camera prefers a color image to a monochrome image obtained using an infrared camera.

For example, there are many places where the amount of light is insufficient during image taking in the sea, and a light source is needed in deep-water places; however, in the case where an image of fish is to be taken, the fish might escape due to the light source. In addition, since light is less likely to be delivered in the sea, it is difficult to perform imaging of distant fish even with a light source.

An object is to provide an imaging method and an imaging system that obtain an image with high visibility and high fidelity of an actual color without using a color filter.

In particular, there is a problem in that in imaging in a dark place with little lighting, such as in the evening or at night, it is difficult to perform imaging with high sensitivity because the amount of received light is small. Accordingly, an image captured in a dark place is inferior to an image captured in a bright place in terms of visibility.

A security camera in an environment with light in a narrow wavelength region needs to precisely keep track of a situation in a captured image as a clue leading to an event, an accident, or the like; thus, the security camera needs to clearly grasp the feature of an object in the captured image in a real time. Accordingly, for example, in the case of a night-vision camera, it is important to perform imaging of an image with high visibility of an object by adjusting the focus on the object even in a dark place.

Among night-vision cameras, there is a camera that acquires color video through color separation with a special color filter using an infrared light source. However, since reflected light of infrared rays is used, there is a problem in that a color is not reflected or is represented by a different color depending on a photographic subject. This problem often occurs when the photographic subject is a material that absorbs infrared rays. For example, a human's skin is likely to be captured as a whiter image than the actual and a warm color such as yellow is sometimes captured in blue.

An object is to provide an imaging method and an imaging system that obtain an image with high visibility and high fidelity of the same color when there is external light even in imaging at night or in a dark place.

Means for Solving the Problems

An imaging system of the present invention includes a solid-state imaging element without a color filter, a storage device, and a learning device. Since the color filter is not used, light attenuation can be avoided, and highly sensitive imaging can be performed even with a small amount of light.

Since the color filter is not included, colorization is performed on obtained monochrome image data (analog data), and coloring is performed using an AI system. With the AI system, that is, the learning device using training data stored in the storage device, the focus can be adjusted by inference using an extracted feature value, and a highly visible color image (colored image data (digital data)) can be obtained even in imaging at night or in a dark place. Note that the learning device includes at least a neural network portion, performs not only learning but also inference, and can output data. In addition, the learning device sometimes performs inference using a learned feature value. In such a case, by storing the learned feature value in the storage device and performing arithmetic operation, the learning device can output data at a level similar to that when not using the learned feature value.

In addition, in the case where part of the edge of a photographic subject becomes unclear due to a small amount of light into the photographic subject, there is a possibility that a boundary cannot be determined and coloring of that portion is incomplete.

In view of this, it is preferable to use an image sensor without a color filter, acquire monochrome image data with wide dynamic range, repeat super-resolution processing more than once, and then perform coloring by determination of a color boundary. In addition, super-resolution processing may be performed on training data at least once. For creation of a learning model for determining a color boundary, by mixing of not only a color picture image but also a color illustration (animation) image as training data, colored image data with a clear color boundary can be obtained. Note that super-resolution processing refers to image processing for generating a high-resolution image from a low-resolution image.

Furthermore, when a learning model is prepared in advance, comparatively bright monochrome image data can be acquired by imaging without using a flash light source in a condition where the amount of light is insufficient, and vividly colored image data can be obtained through colorization based on the monochrome image data.

A video monitoring system or a security system using the imaging system, or a safety information service system can clearly achieve imaging in a comparatively dark place.

Specifically, a monitoring system includes a security camera. The security camera includes a solid-state imaging element without a color filter, a learning device, and a storage device. The solid-state imaging element performs imaging while the security camera senses a person, and a software program for creating colored image data by inference of the learning device is executed using training data of the storage device.

Effect of the Invention

With an imaging system disclosed in this specification, a clear colorization image can be obtained even when image taking is performed in a dim situation with a small amount of light. Accordingly, identification of a person (a face or the like) or distinguishing of the feature of clothes can be performed comparatively easily on the basis of the obtained colorization image. When the imaging system is applied to a security camera, a person's face can be estimated using color video and can also be displayed by a display device.

In particular, in the case where 8K size input image data is obtained by a solid-state imaging element, the area of a light-receiving region provided in each pixel of the solid-state imaging element is narrowed; thus, the amount of obtained light is decreased. However, in the imaging system disclosed in this specification, there is no reduction in the amount of light due to a color filter because the color filter is not used for a solid-state imaging element. Accordingly, it is possible to perform imaging of 8K size image data with high sensitivity.

BRIEF DESCRIPTION OF THE DRAWINGS

FIG. 2 is an example of a source code showing one embodiment of the present invention.

FIG. 3 is an example of a source code showing one embodiment of the present invention.

FIG. 8A, FIG. 8B, and FIG. 8C are diagrams showing filters.

FIG. 10 is an example of a source code showing one embodiment of the present invention.

MODE FOR CARRYING OUT THE INVENTION

Figure 1:
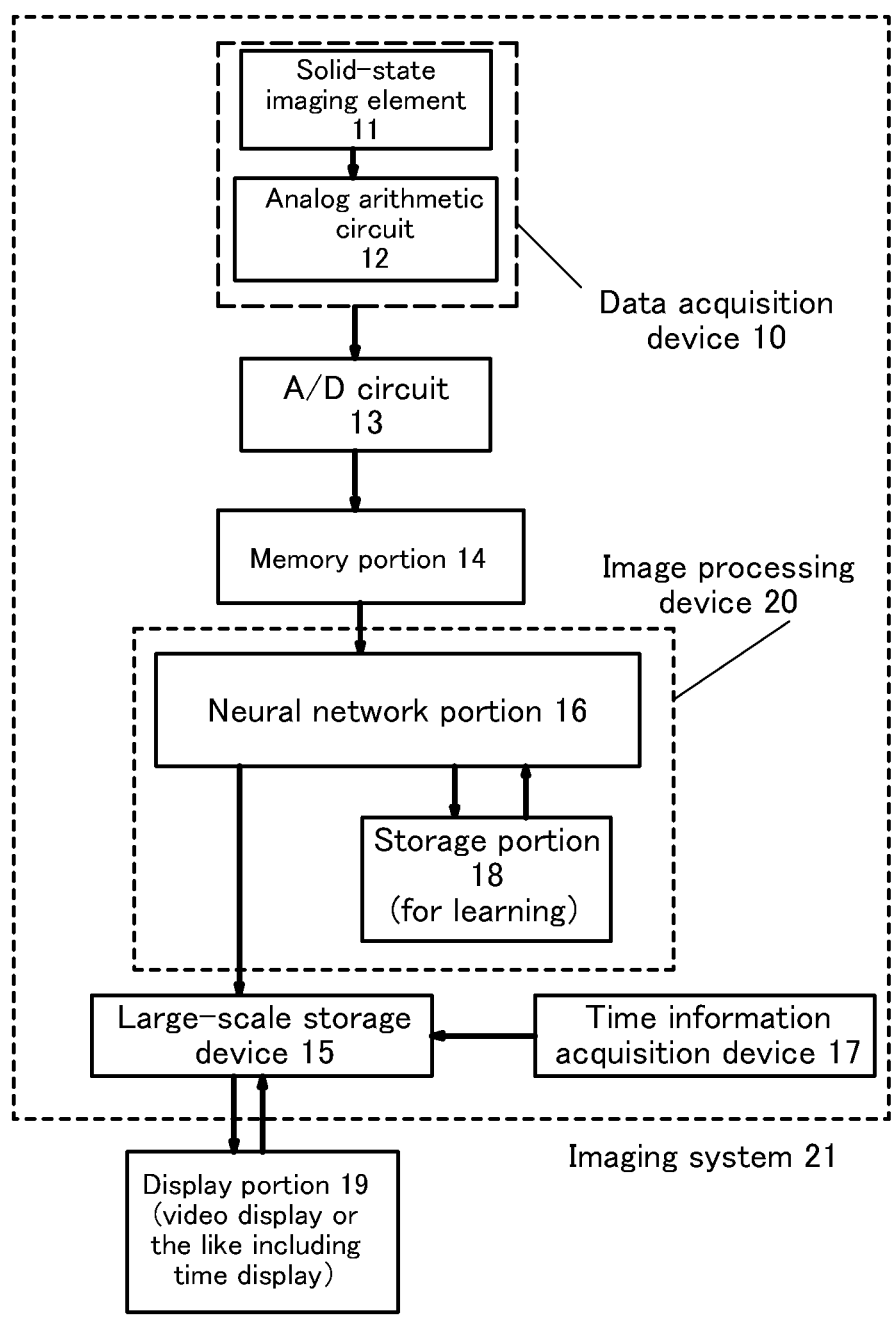
FIG. 1 is a block diagram illustrating one embodiment of the present invention.

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the following embodiments.

Embodiment 1

A structure example of an imaging system 21 used for a video monitoring system or a security system is described with reference to a block diagram illustrated in FIG. 1.

A data acquisition device 10 is a semiconductor chip that includes a solid-state imaging element 11 and an analog arithmetic circuit 12 and does not include a color filter. The data acquisition device 10 includes an optical system such as a lens. Note that the optical system is not particularly limited as long as imaging characteristics are known, and an optical system with any structure may be employed.

An A/D circuit 13 (also referred to as an A/D converter) illustrates an analog-to-digital conversion circuit and converts analog data output from the data acquisition device 10 into digital data. Note that if needed, an amplifier circuit may be provided between the data acquisition device 10 and the A/D circuit 13 so that an analog signal is amplified before conversion into the digital data.

A memory portion 14 is a circuit that stores digital data after conversion and has a structure in which data is stored before input to a neural network portion 16; however, the present invention is not limited to this structure. Although it depends on the amount of data output from the data acquisition device or the data processing capacity of an image processing device, a structure may be employed in which small-scale data output from the A/D circuit 13 is directly input to the neural network portion 16, without storing the small-scale data in the memory portion 14. In addition, a structure may be employed in which the output from the A/D circuit 13 is input to the neural network portion 16 that is at a remote location using Internet communication. For example, the neural network portion 16 may be formed in a server capable of two-way communication.

An image processing device 20 is a device for estimating an edge or a color corresponding to a monochrome image obtained by the data acquisition device 10. The image processing device 20 executes image processing in different stages: a first stage for learning and a second stage for estimation. In this embodiment, the data acquisition device 10 and the image processing device 20 are formed as different devices; however, the data acquisition device 10 and the image processing device 20 can be formed to be integrated. In the case where the data acquisition device 10 and the image processing device 20 are formed to be integrated, a feature value obtained in the neural network portion can also be updated in a real time.

The neural network portion 16 is achieved by software calculation with a microcontroller. The microcontroller is obtained by incorporating a computer system into one integrated circuit (IC). When the calculation scale or data to be handled is large, a plurality of ICs are combined to form the neural network portion 16. A learning device includes at least the plurality of ICs. In addition, it is preferable to use a microcontroller incorporating Linux (registered trademark) that enables use of free software because the total cost of forming the neural network portion 16 can be reduced. Furthermore, another OS (operating system) may be used without being limited to Linux (registered trademark).

Learning of the neural network portion 16 illustrated in FIG. 1 is described below. Training data for learning is stored in a storage portion 18 in advance. A set for learning is used as the training data for learning, and types of images include a landscape picture, a portrait picture, an illustration, and the like. The learning device performs inference by using the training data for learning. The learning device may have any structure as long as it can perform inference by using the training data of the storage portion 18 on the basis of monochrome analog data to output colored image data. In addition, in the case where a learned feature value is used, the learning device may have any structure as long as it can perform arithmetic operation by using data on the feature value of the storage portion 18 on the basis of monochrome analog data to output colored image data. In the case where the learned feature value is used, the amount of data and the amount of arithmetic operation are reduced; thus, there is an advantage in that the learning device can be formed with a small-scale structure, for example, with one or two ICs.

A program is created using Python under operating environments of Linux (registered trademark). In this embodiment, a data frame of Keras is used. Keras is a library that provides useful functions for deep learning. In particular, Keras facilitates data reading and writing from and to an intermediate layer of a neural network portion and the change of a weight coefficient of the neural network portion. In addition, Numpy is loaded so that Python deals with a library of Numpy. Furthermore, openCV is loaded so that an image is edited.

Source codes corresponding to the above processing are shown sequentially below a row of In[1] in FIG. 2.

Next, data is read. Color images are used as the data. Thousands of or tens of thousands of color images are preferably prepared. In the case where the number of files of the color images is huge, calculation load is applied during read processing; thus, the color images may be read after being converted into an h5py format, for example.

The following convolutional neural network (also referred to as an artificial neural network) can be used for colorization. For example, in Python, a description can be made like that below a row of In[X] in FIG. 3 (note that X is a given number, which can be changed according to a program) by using keras. Such a neural network is also referred to as a U-net. The U-net has a function of data interpolation from a convolutional layer to a deconvolutional layer that is called Skip-Connection, prevents gradient loss, and can create a favorable learning model.

During learning, an image obtained by grayscale transformation of the color image of the training data is input to the neural network represented by In[X] in FIG. 3. For grayscale transformation processing of the image, openCV can be used, for example.

GaN (Generative Adversarial Networks) where the neural network is used as Generator may be used.

Output data of the neural network portion 16 is linked to time data of a time information acquisition device 17 and is stored in a large-scale storage device 15. Data obtained from the start of imaging is accumulated and stored in the large-scale storage device 15.

A display portion 19 (video display or the like including time display) may include an operation input portion such as a touch panel so that a user can select data from the data stored in the large-scale storage device 15 and observe the data as appropriate. In addition, the display portion 19 may be accessible to the large-scale storage device 15 through Internet communication by remote control, and the large-scale storage device 15 may be provided with a transmission antenna or a reception antenna. The imaging system 21 can be used as a video monitoring system or a security system.

In addition, a display portion of a user's portable information terminal (a smartphone or the like) can be the display portion 19. When the display portion of the portable information terminal accesses to the large-scale storage device 15, monitoring can also be performed regardless of user's whereabouts.

The location where the imaging system 21 is placed is not limited to a room wall. When all or part of the structure of the imaging system 21 is incorporated in an unmanned aerial vehicle (also referred to as a drone) provided with a rotor blade, video taken from the air can also be monitored. In particular, imaging can be performed under an environment with a small amount of light, such as lighting of a road lamp in the evening or at night.

In addition, although the video monitoring system or the security system is described in this embodiment, there is no particular limitation. When a camera for imaging of vehicle surroundings or a radar is combined with an ECU (Electronic Control Unit) for image processing or the like, the present invention can also be applied to a vehicle capable of semi-automatic operation or a vehicle capable of full automatic operation. A vehicle using an electric motor includes a plurality of ECUs, and engine control and the like are performed by the ECUs. The ECU includes a microcomputer. The ECU is connected to a CAN (Controller Area Network) provided in the electric vehicle. The CAN is a type of a serial communication standard used as an in-vehicle LAN. For the ECU, a CPU or a GPU is used. For example, a structure may be employed in which a solid-state imaging element without a color filter is used as one of a plurality of cameras (dashboard cameras, rear cameras, and the like) incorporated in an electric vehicle so that inference of an obtained monochrome image can be performed in the ECU through the CAN and a colorization image can be created and displayed by an in-vehicle display device or the display portion of the portable information terminal.

Embodiment 2

Figure 4:
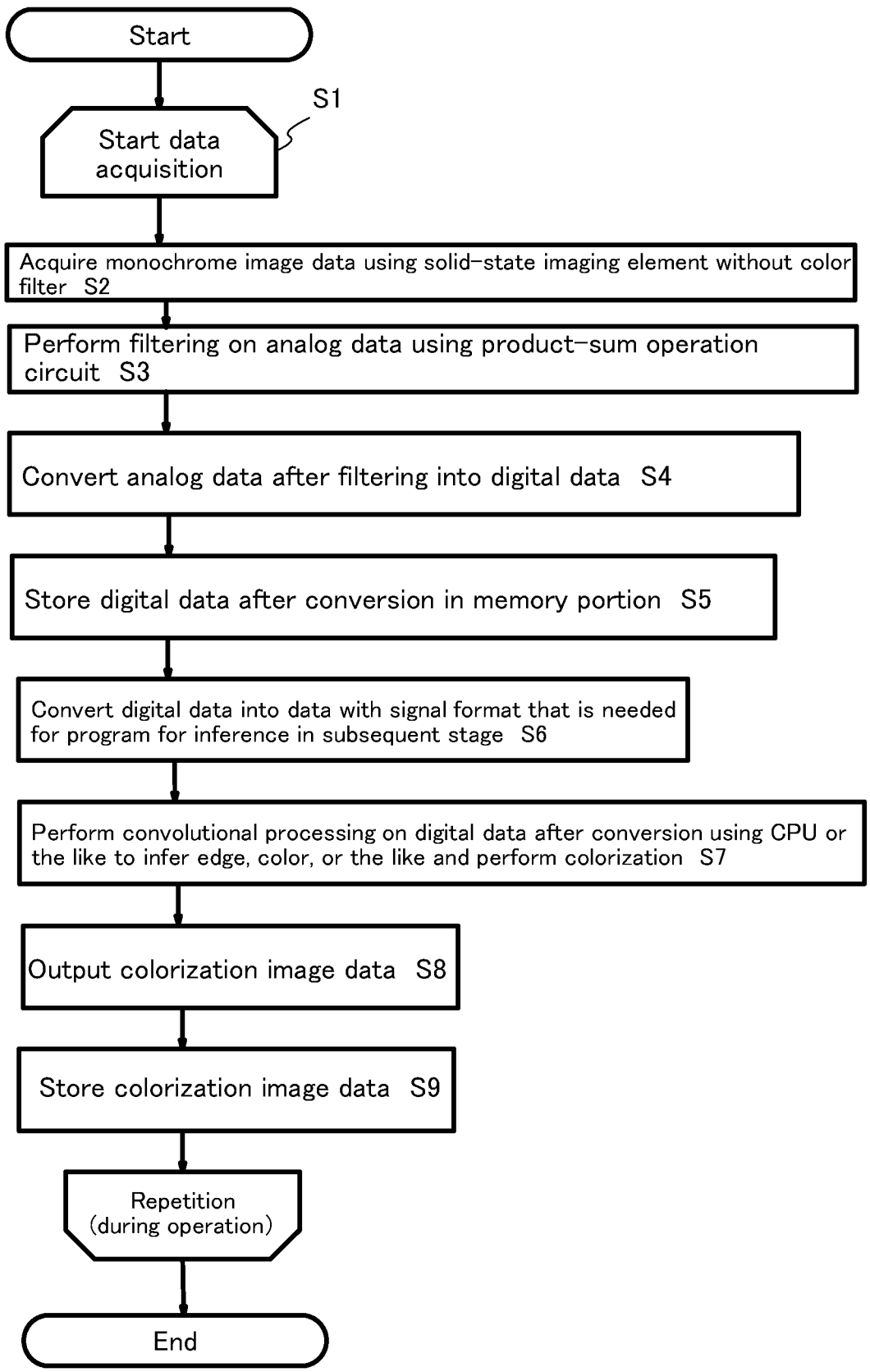
FIG. 4 is an example of a flow chart showing one embodiment of the present invention.

In this embodiment, FIG. 4 illustrates an example of a flow of performing colorization on monochrome video obtained by the solid-state imaging element 11 using the block diagram and the program described in Embodiment 1.

The imaging system 21 described in Embodiment 1 is placed in a location to be monitored (a room, a parking lot, a front door, or the like) and is activated so that continuous shooting is started.

First, preparation for data acquisition is started (S1).

Monochrome image data is acquired using a solid-state imaging element without a color filter (S2). Note that a plurality of solid-state imaging elements arranged in a matrix direction is sometimes referred to as a pixel array.

Next, obtained analog data is subjected to filtering by using a product-sum operation circuit (S3).

Figure 5:
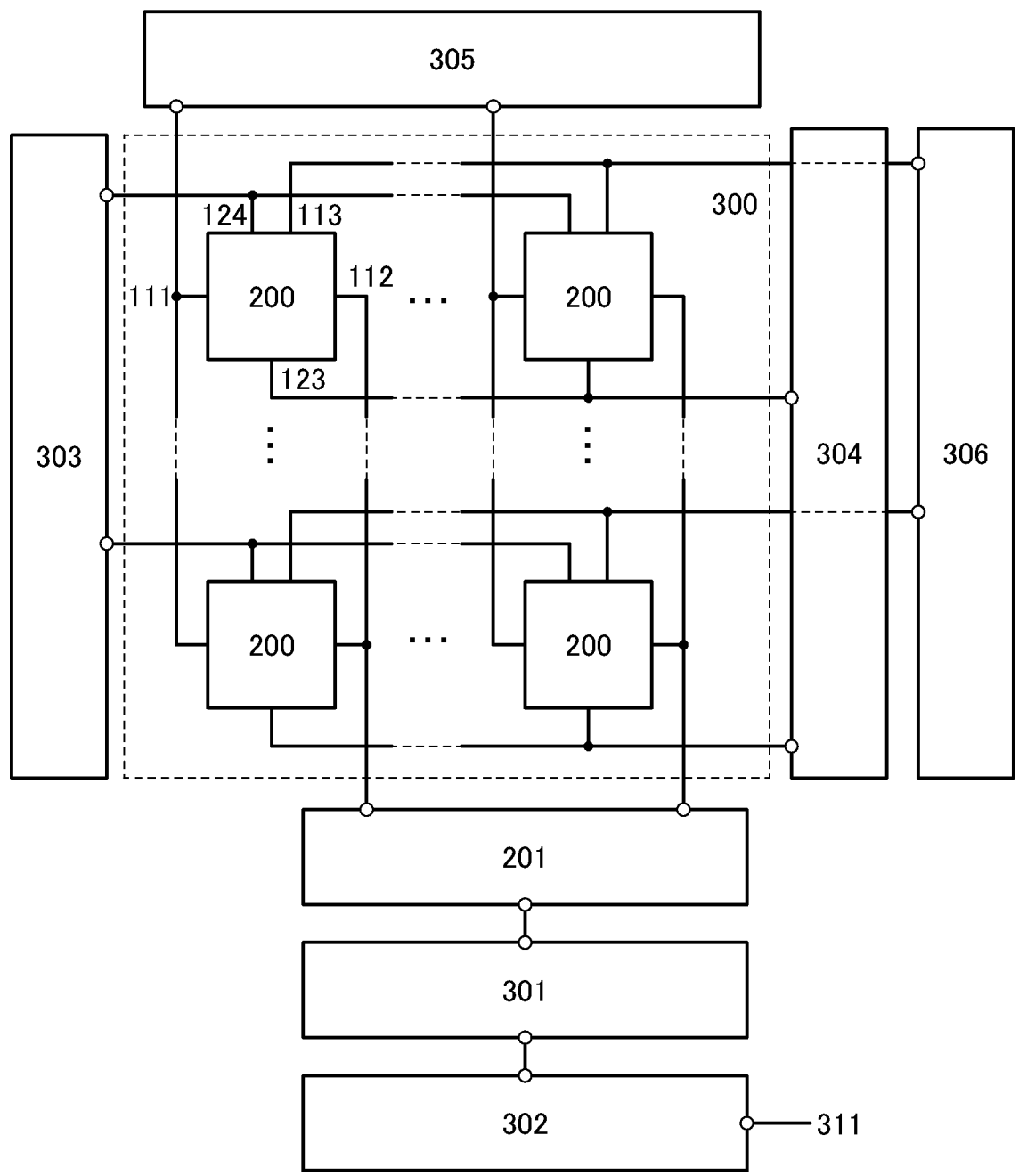
FIG. 5 is a block diagram illustrating an imaging device.

Steps S2 and S3 are performed in an imaging device illustrated in FIG. 5. Here, the imaging device is described below.

FIG. 5 is a block diagram illustrating the imaging device. The imaging device includes a pixel array 300, a circuit 201, a circuit 301, a circuit 302, a circuit 303, a circuit 304, a circuit 305, and a circuit 306. Note that each of the structures of the circuit 201 and the circuit 301 to the circuit 306 is not limited to a single circuit structure and is sometimes composed of a combination of a plurality of circuits. Alternatively, any of the plurality of circuits described above may be combined. Furthermore, a circuit other than the above circuits may be connected.

The pixel array 300 has an imaging function and an arithmetic function. The circuits 201 and 301 each have an arithmetic function. The circuit 302 has an arithmetic function or a data conversion function. The circuits 303, 304, and 306 each have a selection function. The circuit 303 is electrically connected to the pixel block 200 through a wiring 124. The circuit 304 is electrically connected to a pixel block 200 through a wiring 123. The circuit 305 has a function of supplying a potential for product-sum operation to a pixel. As a circuit having a selection function, a shift register, a decoder, or the like can be used. The circuit 306 is electrically connected to the pixel block 200 through a wiring 113. Note that the circuits 301 and 302 may be provided outside.

Figure 6:
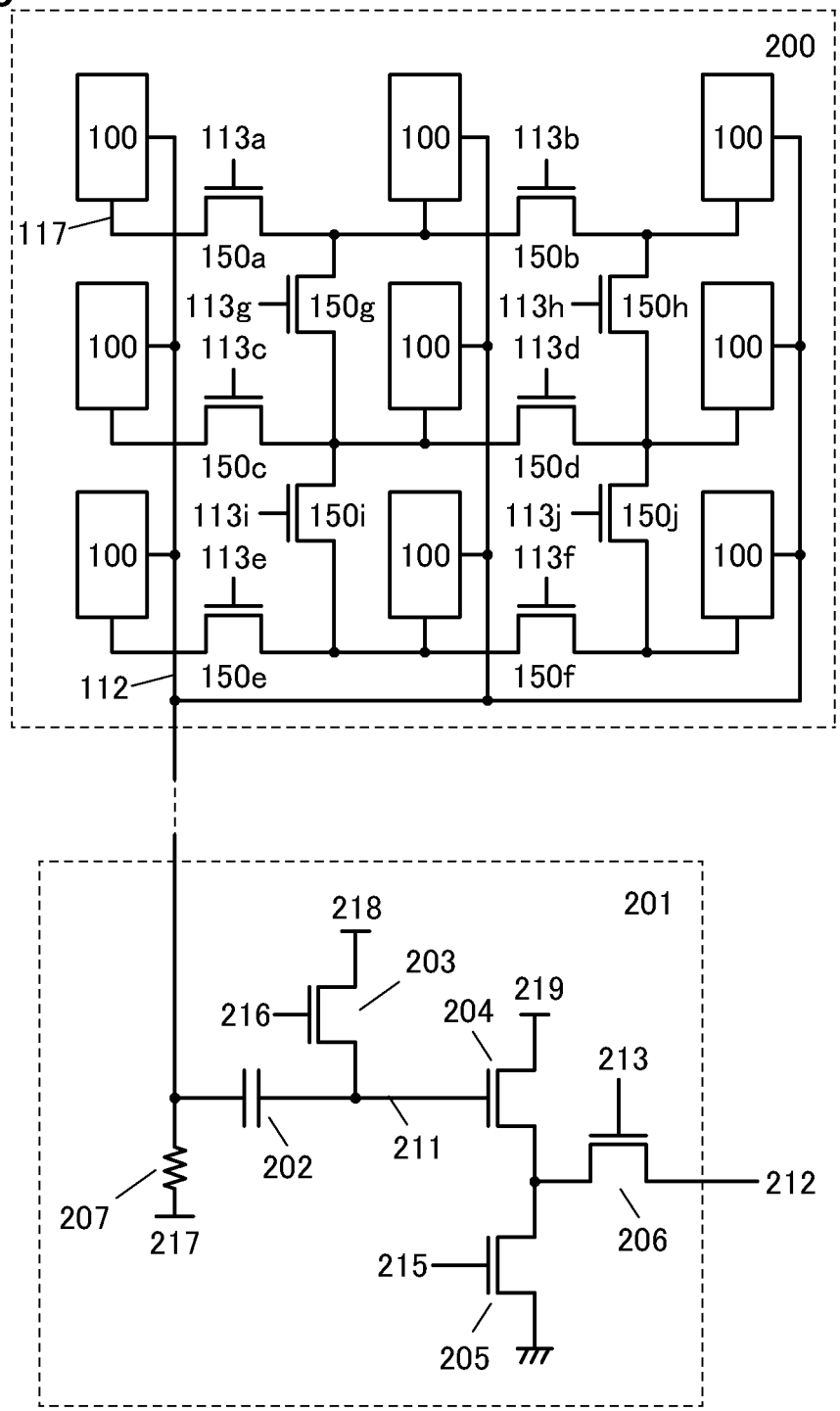
FIG. 6 is a diagram illustrating a pixel block 200 and a circuit 201.

The pixel array 300 includes a plurality of pixel blocks 200. As illustrated in FIG. 6, the pixel block 200 includes a plurality of pixels 100 arranged in a matrix, and each of the pixels 100 is electrically connected to the circuit 201 through a wiring 112. Note that the circuit 201 can also be provided in the pixel block 200.

Furthermore, the pixels 100 are electrically connected to adjacent pixels 100 through transistors 150 (transistors 150g to 150j). The functions of the transistors 150 are described later.

The pixels 100 can acquire image data and generate data obtained by adding the image data and a weight coefficient. Note that the number of pixels included in the pixel block 200 is 3×3 in an example illustrated in FIG. 6 but is not limited to this. For example, the number of pixels can be 2×2, 4×4, or the like. Alternatively, the number of pixels in a horizontal direction and the number of pixels in a vertical direction may differ from each other. Furthermore, some pixels may be shared by adjacent pixel blocks.

The pixel block 200 and the circuit 201 can operate as a product-sum operation circuit.

Figure 7:
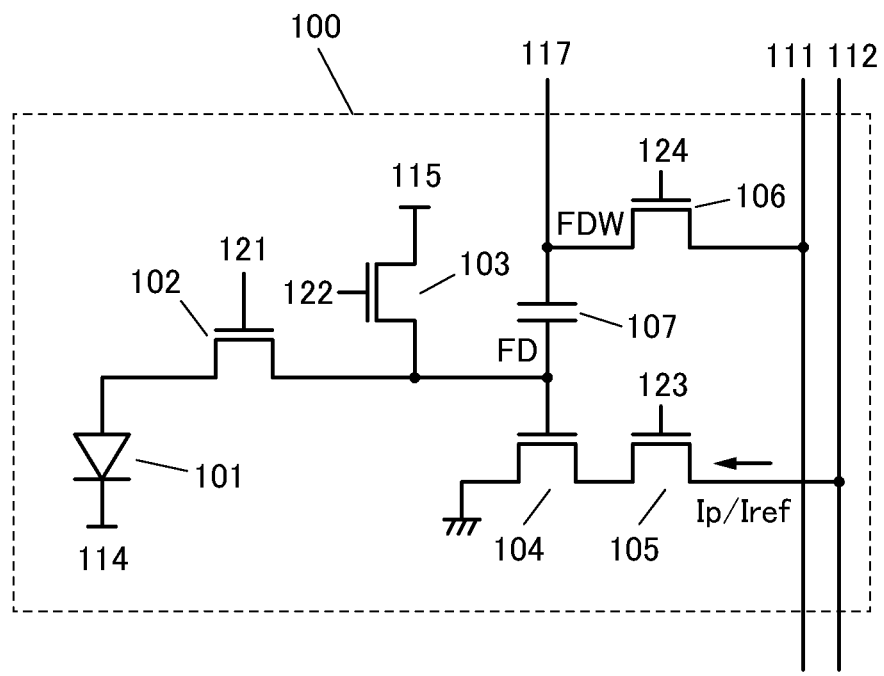
FIG. 7 is a diagram illustrating a pixel 100.

As illustrated in FIG. 7, the pixel 100 can include a photoelectric conversion device 101, a transistor 102, a transistor 103, a transistor 104, a transistor 105, a transistor 106, and a capacitor 107.

One electrode of the photoelectric conversion device 101 is electrically connected to one of a source and a drain of the transistor 102. The other of the source and the drain of the transistor 102 is electrically connected to one of a source and a drain of the transistor 103, a gate of the transistor 104, and one electrode of the capacitor 107. One of a source and a drain of the transistor 104 is electrically connected to one of a source and a drain of the transistor 105. The other electrode of the capacitor 107 is electrically connected to one of a source and a drain of the transistor 106.

The other electrode of the photoelectric conversion device 101 is electrically connected to a wiring 114. The other of the source and the drain of the transistor 103 is electrically connected to a wiring 115. The other of the source and the drain of the transistor 105 is electrically connected to the wiring 112. The other of the source and the drain of the transistor 104 is electrically connected to a GND wiring or the like. The other of the source and the drain of the transistor 106 is electrically connected to a wiring 111. The other electrode of the capacitor 107 is electrically connected to a wiring 117.

A gate of the transistor 102 is electrically connected to a wiring 121. A gate of the transistor 103 is electrically connected to a wiring 122. A gate of the transistor 105 is electrically connected to the wiring 123. A gate of the transistor 106 is electrically connected to the wiring 124.

Here, a point where the other of the source and the drain of the transistor 102, the one of the source and the drain of the transistor 103, the one electrode of the capacitor 107, and the gate of the transistor 104 are electrically connected is referred to as a node FD. Furthermore, a point where the other electrode of the capacitor 107 and the one of the source and the drain of the transistor 106 are electrically connected is referred to as a node FDW.

The wirings 114 and 115 can each have a function of a power supply line. For example, the wiring 114 can function as a high potential power supply line, and the wiring 115 can function as a low potential power supply line. The wirings 121, 122, 123, and 124 can function as signal lines that control the conduction of the respective transistors. The wiring 111 can function as a wiring for supplying a potential corresponding to a weight coefficient to the pixel 100. The wiring 112 can function as a wiring that electrically connects the pixel 100 and the circuit 201. The wiring 117 can function as a wiring that electrically connects the other electrode of the capacitor 107 of the pixel 100 and the other electrode of the capacitor 107 of another pixel 100 through the transistor 150 (see FIG. 6).

Note that an amplifier circuit or a gain control circuit may be electrically connected to the wiring 112.

As the photoelectric conversion device 101, a photodiode can be used. There is no limitation on types of photodiodes, and it is possible to use a Si photodiode in which a photoelectric conversion layer contains silicon, an organic photodiode in which a photoelectric conversion layer includes an organic photoconductive film, or the like. Note that in order to increase light detection sensitivity under low illuminance conditions, an avalanche photodiode is preferably used.

The transistor 102 can have a function of controlling the potential of the node FD. The transistor 103 can have a function of initializing the potential of the node FD. The transistor 104 can have a function of controlling current fed by the circuit 201 in accordance with the potential of the node FD. The transistor 105 can have a function of selecting a pixel. The transistor 106 can have a function of supplying the potential corresponding to the weight coefficient to the node FDW.

In the case where an avalanche photodiode is used as the photoelectric conversion device 101, high voltage is sometimes applied and thus a transistor with high breakdown voltage is preferably used as a transistor connected to the photoelectric conversion device 101. As the transistor with high breakdown voltage, a transistor using a metal oxide in its channel formation region (hereinafter an OS transistor) or the like can be used, for example. Specifically, an OS transistor is preferably employed as the transistor 102.

An OS transistor also has a feature of extremely low off-state current. When OS transistors are used as the transistors 102, 103, and 106, the charge retention period of the node FD and the node FDW can be lengthened greatly. Therefore, a global shutter mode in which charge accumulation operation is performed in all the pixels at the same time can be employed without complicating the circuit structure and the operation method. Furthermore, while image data is retained at the node FD, arithmetic operation using the image data can be performed more than once.

Meanwhile, it is sometimes desirable that the transistor 104 have excellent amplifying characteristics. In addition, a transistor having high mobility capable of high-speed operation is sometimes preferably used as the transistor 106. Accordingly, transistors using silicon in their channel formation regions (hereinafter Si transistors) may be employed as the transistors 104 and 106.

Note that without limitation to the above, an OS transistor and a Si transistor may be freely employed in combination. Alternatively, all the transistors may be OS transistors. Alternatively, all the transistors may be Si transistors. Examples of Si transistors include a transistor including amorphous silicon, a transistor including crystalline silicon (microcrystalline silicon, low-temperature polysilicon, or single crystal silicon), and the like.

The potential of the node FD in the pixel 100 is determined by the potential obtained by adding a reset potential supplied from the wiring 115 and a potential (image data) generated by photoelectric conversion by the photoelectric conversion device 101. Alternatively, the potential of the node FD in the pixel 100 is determined by capacitive coupling of the potential corresponding to a weight coefficient supplied from the wiring 111. Thus, current corresponding to data in which a given weight coefficient is added to the image data can flow through the transistor 105.

Note that the circuit structures of the pixel 100 described above are examples, and the photoelectric conversion operation can also be performed with other circuit structures.

As illustrated in FIG. 6, the pixels 100 are electrically connected to each other through the wiring 112. The circuit 201 can perform arithmetic operation using the sum of currents flowing through the transistors 104 of the pixels 100.

The circuit 201 includes a capacitor 202, a transistor 203, a transistor 204, a transistor 205, a transistor 206, and a resistor 207.

One electrode of the capacitor 202 is electrically connected to one of a source and a drain of the transistor 203. The one of the source and the drain of the transistor 203 is electrically connected to a gate of the transistor 204. One of a source and a drain of the transistor 204 is electrically connected to one of a source and a drain of the transistor 205. The one of the source and the drain of the transistor 205 is electrically connected to one of a source and a drain of the transistor 206. One electrode of the resistor 207 is electrically connected to the other electrode of the capacitor 202.

The other electrode of the capacitor 202 is electrically connected to the wiring 112. The other of the source and the drain of the transistor 203 is electrically connected to a wiring 218. The other of the source and the drain of the transistor 204 is electrically connected to a wiring 219. The other of the source and the drain of the transistor 205 is electrically connected to a reference power supply line such as a GND wiring. The other of the source and the drain of the transistor 206 is electrically connected to a wiring 212. The other electrode of the resistor 207 is electrically connected to a wiring 217.

The wirings 217, 218, and 219 can each have a function of a power supply line. For example, the wiring 218 can have a function of a wiring that supplies a potential dedicated to reading. The wirings 217 and 219 can function as high potential power supply lines. The wirings 213, 215, and 216 can function as signal lines for controlling the conduction of the respective transistors. The wiring 212 is an output line and can be electrically connected to the circuit 301 illustrated in FIG. 5, for example.

The transistor 203 can have a function of resetting the potential of the wiring 211 to the potential of the wiring 218. The wiring 211 is a wiring that is electrically connected to the one electrode of the capacitor 202, the one of the source and the drain of the transistor 203, and the gate of the transistor 204. The transistors 204 and 205 can have a function of a source follower circuit. The transistor 206 can have a function of controlling reading. The circuit 201 has a function of a correlated double sampling circuit (a CDS circuit) and can be replaced with a circuit having the function and another structure.

In one embodiment of the present invention, offset components other than the product of image data (X) and a weight coefficient (W) are eliminated, and an objective WX is extracted. WX can be calculated using data obtained when imaging is performed, data obtained when imaging is not performed, and data obtained by adding weights to the respective data.

The total amount of currents ($I_p$) flowing through the pixels 100 when imaging is performed is $k\Sigma(X-V_{th})^2$, and the total amount of currents ($I_p$) flowing through the pixels 100 when weights are added is $k\Sigma(W+X-V_{th})^2$. In addition, the total amount of currents ($I_{ref}$) flowing through the pixels 100 when imaging is not performed is $k\Sigma(0-V_{th})^2$, and the total amount of currents ($I_{ref}$) flowing through the pixels 100 when weights are added is $k\Sigma(W-V_{th})^2$. Here, k is a constant and $V_{th}$ is the threshold voltage of the transistor 105.

First, a difference (data A) between the data obtained when imaging is performed and the data obtained by adding a weight to the data is calculated. The difference is $k\Sigma((X-V_{th})^2-(W+X-V_{th})^2)=k\Sigma(-W^2-2W\cdot X+2W\cdot V_{th})$.

Next, a difference (data B) between the data obtained when imaging is not performed and the data obtained by adding a weight to the data is calculated. The difference is $k\Sigma(((0-V_{th})^2-(W-V_{th})^2)=k\Sigma(-W^2+2W\cdot V_{th})$.

Then, a difference between the data A and the data B is calculated. The difference is $k\Sigma(-W^2-2W\cdot X+2W\cdot V_{th}-(-W^2+2W\cdot V_{th}))=k\Sigma(-2W\cdot X)$. That is, offset components other than the product of the image data (X) and the weight coefficient (W) can be eliminated.

The circuit 201 can read the data A and the data B. Note that the calculation of the difference between the data A and the data B can be performed by the circuit 301, for example.

Here, the weights supplied to the entire pixel block 200 function as a filter. As the filter, a convolutional filter of a convolutional neural network (CNN) can be used, for example. Alternatively, an image processing filter such as an edge extraction filter can be used. As examples of the edge extraction filter, a Laplacian filter illustrated in FIG. 8A, a Prewitt filter illustrated in FIG. 8B, a Sobel filter illustrated in FIG. 8C, and the like can be given.

In the case where the number of pixels 100 included in the pixel block 200 is 3×3, elements of the edge extraction filter can be assigned and supplied as weights to the pixels 100. As described above, to calculate the data A and the data B, data obtained when imaging is performed, data obtained when imaging is not performed, and data obtained by adding weights to the respective data can be utilized for the calculation. Here, the data obtained when imaging is performed and the data obtained when imaging is not performed are data to which weights are not added and can also be referred to as data obtained by adding a weight 0 to all the pixels 100.

The edge extraction filters illustrated as examples in FIG. 8A to FIG. 8C are filters where the sum ($\Sigma\Delta W/N$, where N is the number of elements) of elements (weights: $\Delta W$) is 0. Therefore, without additional operation of supplying $\Delta W=0$ from another circuit, the operation of obtaining $\Sigma\Delta W/N$ enables data corresponding to the data obtained by adding $\Delta W=0$ to all the pixels 100 to be acquired.

This operation corresponds to turning on the transistors 150 (the transistors 150a to 150f) provided between the pixels 100 (see FIG. 6). By turning on the transistors 150, the node FDW in each of the pixels 100 is short-circuited through the wiring 117. At this time, charge accumulated in the node FDW in each of the pixels 100 is redistributed, and in the case where the edge extraction filters illustrated as examples in FIG. 8A to FIG. 8C are used, the potential of the node FDW ($\Delta W$) becomes 0 or substantially 0. Thus, the data corresponding to the data obtained by adding $\Delta W=0$ can be acquired.

Note that in the case of rewriting weights ($\Delta W$) by supplying charge from a circuit outside the pixel array 300, it takes time to complete rewriting owing to the capacitance of the long-distance wiring 111 or the like. In contrast, the pixel block 200 is a minute region, and the wiring 117 has a short distance and small capacitance. Therefore, weights ($\Delta W$) can be rewritten at high speed by the operation of redistributing charge accumulated in the nodes FDW in the pixel block 200.

In the pixel block 200 illustrated in FIG. 6, a structure where the transistors 150a to 150f are electrically connected to different gate lines (wirings 113a to 1130 is illustrated. With this structure, the conductions of the transistors 150a to 150f can be controlled independently of each other, and the operation of obtaining $\Sigma\Delta W/N$ can be performed selectively. In addition, FIG. 6 illustrates a structure where the transistor 150g to the transistor 150j are electrically connected to different gate lines (113g to 113i).

For example, in the case of using a filter illustrated in FIG. 8B, FIG. 8C, or the like, there are some pixels where $\Delta W=0$ is initially supplied. Assuming that $\Sigma\Delta W/N=0$, the pixels where $\Delta W=0$ is supplied may be excluded from the target of summation. The exclusion of the pixels eliminates the need of supplying a potential for operating some of the transistors 150a to 150f, which can reduce power consumption. Note that although nine transistors 150 (the transistors 150a to 150f) are provided between the pixels 100 in the examples illustrated in FIG. 6 and FIG. 8, the number of transistors 150 may be further increased. In addition, in the transistors 150g to 150j, some transistors may be omitted so that a parallel path is canceled.

Product-sum operation result data output from the circuit 201 is sequentially input to the circuit 301. The circuit 301 may have a variety of arithmetic functions in addition to the above-described function of calculating the difference between the data A and the data B. For example, the circuit 301 can have a structure similar to that of the circuit 201. Alternatively, the function of the circuit 301 may be replaced by software processing.

In addition, the circuit 301 may include a circuit that performs arithmetic operation of an activation function. A comparator circuit can be used as the circuit, for example. A comparator circuit outputs a result of comparing input data and a set threshold as binary data. In other words, the pixel blocks 200 and the circuit 301 can operate as some components of a neural network.

Data output from the circuit 301 is sequentially input to the circuit 302. The circuit 302 can have a structure including a latch circuit, a shift register, and the like, for example. With this structure, parallel-serial conversion can be performed and data input in parallel can be output to a wiring 311 as serial data.

The connection destination of the wiring 311 is not limited. For example, the wiring 311 can be connected to the A/D circuit 13, the neural network portion 16, or the like illustrated in FIG. 1. Alternatively, the connection destination of the wiring 311 may be an FPGA (a field-programmable gate array).

Next, the A/D circuit 13 converts the analog data after filtering into digital data (S4).

Next, the digital data after conversion is stored in the memory portion 14 (a digital memory portion) (S5).

Next, the digital data is converted into data with a signal format (JPEG (registered trademark) or the like) that is needed for a program for inference in a subsequent stage (S6).

Next, the digital data after conversion is subjected to convolutional processing by using a CPU or the like, inference of an edge, a color, or the like is performed, and colorization is performed (S7). Instead of the CPU, one integrated IC chip including a GPU (Graphics Processing Unit), a PMU (Power Management Unit), or the like may be used. Then, colorization image data is output (S8). After that, the colorization image data as well as time data such as date and time is stored (S9). For storage, the data is accumulated in the large-scale storage device 15, i.e., what is called a large-capacity storage device (a hard disk or the like) or a database.

Acquisition of the colorization image data is repeated (during operation). Owing to the repetitive acquisition of the colorization image data, real-time colorization can also be performed.

The thus obtained colorization image data uses an imaging element without a color filter and is based on a monochrome image with wide dynamic range; thus, even in the case where a conventional imaging element with a color filter cannot perform identification because of a small amount of light, identifiable colorization image data can be obtained. The imaging system described in this embodiment makes one or more computers achieve the above-described respective steps (S4 to S9).

In addition, when a latent variable (a feature value) is monitored using cos similarity as a means of real-time colorization and focus adjustment is performed by an optical system so that fluctuations are reduced, adjustment can be performed so that an object is in focus even when the object moves during image taking.

Furthermore, inference may be performed using an extracted feature value. Focus adjustment may be performed so that fluctuations are reduced in inference results. For example, when a person is subjected to inference, focus adjustment may be performed so that its likelihood is constant or increased.

When inference is performed, an object subjected to imaging can be determined immediately. Therefore, for example, for security use, in the case where an object is determined to be dangerous, a report on the object can also be notified to required contact addresses through portable information terminals such as smartphones at that point. Moreover, even when the focus is shifted, a sharp image obtained by removal of an image blur can also be subjected to inference.

Embodiment 3

In this embodiment, an example is described in which smooth image processing or fine coloring processing as compared to the colorization image data obtained in Embodiment 2 can be performed.

Figure 9:
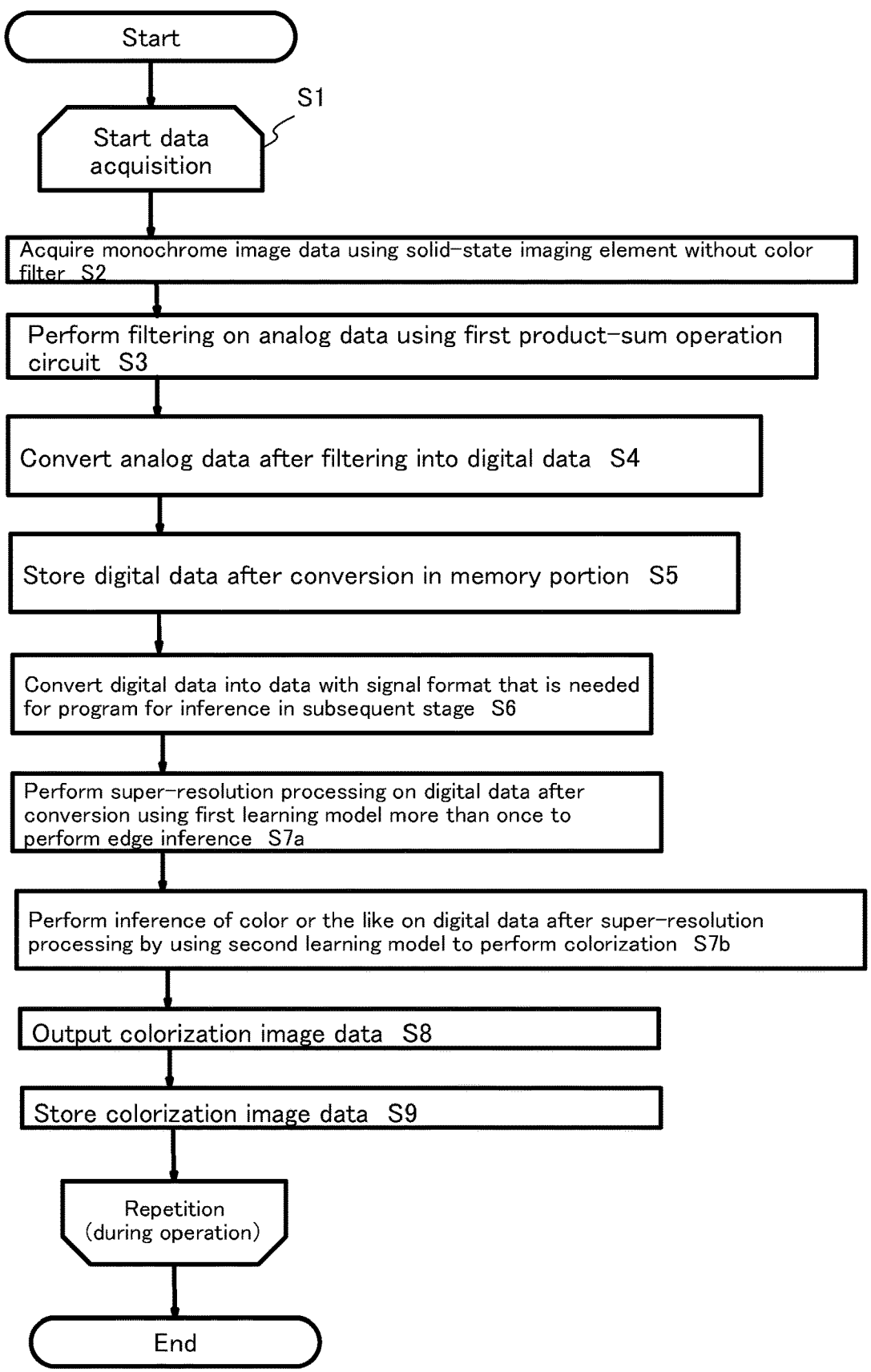
FIG. 9 is an example of a flow chart showing one embodiment of the present invention.

FIG. 9 shows a flow chart. Note that the same reference numerals are used for steps that are the same as those in the flow chart shown in FIG. 4 in Embodiment 2. Since S1 to S6 and S8 to S9 in FIG. 4 are the same as those in FIG. 9, detailed descriptions are omitted here.

As shown in FIG. 9, after step S6, digital data after conversion is subjected to super-resolution processing using a first learning model more than once so that edge inference is performed (S7a).

Then, the digital data after super-resolution processing is subjected to inference of a color or the like by using a second learning model so that colorization is performed (S7b). Subsequent steps are the same as those in Embodiment 2.

For training data of the second learning model, super-resolution processing is performed in advance more than once, an animation image is mixed into a picture image, or an edge is emphasized by an OPENCV drawcontours function or the like. Note that as to the mixing ratio of the picture image and the animation image, in the case where the picture image is 2, the animation image is 1. The animation image is a type of illustration and includes many edge components or color components. In processing for colorization of a monochrome image, the edge is extracted as a feature value in a convolutional layer, and the color of each region of the image is subjected to inference based on the feature value; thus, using the image including many edge components as the training data is effective in efficient machine learning. When the animation image is used as the training data, the number of pieces of training data for obtaining a color image that can reach certain criteria can be reduced, the time required for machine learning can be shortened, and the structure of a neural network portion can be simplified. Note that the neural network portion is part of machine learning. In addition, deep learning is part of the neural network portion.

Learning of a neural network portion in this embodiment is described below.

A program is created using Python under operating environments of Linux (registered trademark). In this embodiment, a data frame of Keras is used. Keras is a library that provides useful functions for deep learning. In particular, Keras facilitates data reading and writing from and to an intermediate layer of a neural network portion and the change of a weight coefficient of the neural network portion. In addition, Numpy is loaded so that Python deals with a library of Numpy. Furthermore, scipy is used for image processing.

A source code corresponding to the above-described processing is described below a row of In[Y1] in FIG. 10 (note that Y1 is a given number, which can be changed according to a program).

Next, data is read. In the case of this embodiment, a high-resolution image is used as the training data. The training data is data used for supervised learning or a data set that has been subjected to class classification. A color image or a monochrome image can be used as the image. Thousands of or tens of thousands of images are preferably prepared. In the case where the number of files of the images is huge, calculation load is applied during read processing; thus, the images may be read after being converted into the h5py format, for example.

Super-resolution processing is composed of a three-layer convolutional neural network. For example, in Python, a description can be made like that below a row of In[Y2] in FIG. 10 (note that Y2 is a given number, which can be changed according to a program, when it is in a stage after Y1) by using a keras Sequential model. Note that in In[Y2], an example in which an image of 33×33 pixels is input is described. Although the example of the image of 33×33 pixels is described in this embodiment, there is no particular limitation. A 2K size (1920×1080 pixels) image or a 4K size (3840×2160 pixels) image may be used. Note that the size corresponds to a resolution, and the neural network is designed in accordance with input image data or output image data. In addition, the input image data and the output image data may be different from each other, and for example, after QHD size (960×540 pixels) input image data is obtained, a 2K size output image may be used. In the case where 8K size input image data is obtained by solid-state imaging elements, the amount of light obtained by each solid-state imaging element is decreased; thus, it is particularly preferable not to use a color filter because a large amount of light can be obtained.

During learning, an image obtained by decreasing the resolution of the image of the training data is input to a neural network represented by In[Y3]. Processing for decreasing the resolution can be described below a row of In[Y3] in FIG. 10 (note that Y3 is a given number, which can be changed according to a program, when it is in a stage after Y2) by using scipy, for example. Here, processing for decreasing the resolution to one-third is described.

A model capable of outputting an image can be created by using such training data and a code. During inference, a low-resolution image can be input and a high-resolution image can be output by using the model. An imaging system described in this embodiment makes one or more computers achieve the above-described respective steps (S4 to S9).

GaN in which the neural network is used as Generator may be used.

The edge of colorization image data obtained in this embodiment becomes smoother than the image data in Embodiment 2, and optimal colorization is performed.

Furthermore, in the case where a unique training image is prepared, for example, when coloring of rare fish is to be performed, a colorization model can be effectively learned using this training image even in the case where there is only a training image with a blur edge at the time of using a training image of similar fish.

Embodiment 4

In this embodiment, examples of electronic devices that can use the imaging device used for an image taking system according to one embodiment of the present invention include display devices, personal computers, image storage devices or image reproducing devices provided with storage media, cellular phones, game machines including portable game machines, portable data terminals, e-book readers, cameras such as video cameras and digital still cameras, goggle-type displays (head-mounted displays), navigation systems, audio reproducing devices (car audio players, digital audio players, and the like), copiers, facsimiles, printers, multifunction printers, automated teller machines (ATM), vending machines, and the like. FIG. 11 illustrates specific examples of such electronic devices.

Figure 11A:
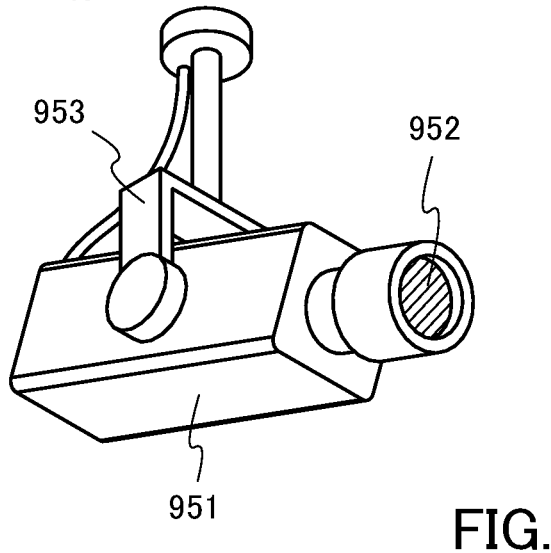
FIG. 11A, FIG. 11B, and FIG. 11C are examples of applied products illustrating one embodiment of the present invention.

FIG. 11A is a surveillance camera, which includes a housing 951, a lens 952, a support portion 953, and the like. The image taking system according to one embodiment of the present invention can be included so that an image in the surveillance camera can be obtained. A neural network portion is included in the housing 951. Note that a surveillance camera is a name in common use and does not limit the application thereof. A device that has a function of a surveillance camera is also called a camera or a video camera, for example. An image sensor without using a color filter is used for the surveillance camera. In addition, when the program shown in Embodiment 2 or Embodiment 3 is incorporated as a software program and is executed in the neural network portion, colored image data can be created. In the case where a plurality of surveillance cameras are used and the surveillance camera in this embodiment is used as at least one of the plurality of surveillance cameras, a color image that is difficult to acquire with a conventional surveillance camera can be acquired under a dim environment, so that a combination of the surveillance camera in this embodiment with the conventional surveillance camera can enhance the monitoring system.

Figure 11B:
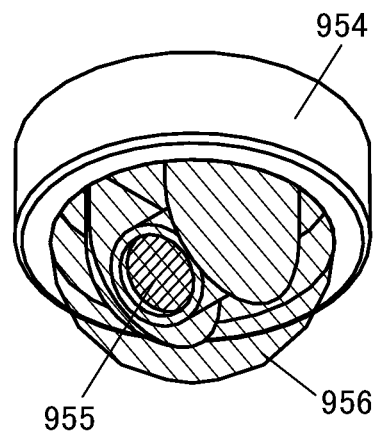

FIG. 11B is also a surveillance camera, which includes a support base 954, a camera unit 955, a protection cover 956, and the like. The camera unit 955 is provided with a rotation mechanism and the like and can capture an image of all of the surroundings when provided on a ceiling. The camera unit 955 can be used as an imaging device included in a monitoring system according to one embodiment of the present invention. In addition, when a neural network portion of the camera unit 955 makes estimation based on data obtained by the camera unit 955, a suspicious person can be identified from data obtained by imaging through colorization or super-resolution processing.

Figure 11C:
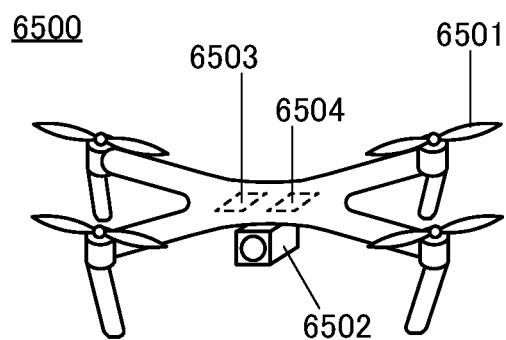

FIG. 11C illustrates an example of a flying object. A flying object 6500 illustrated in FIG. 11C includes propellers 6501, a camera 6502, a battery 6503, and the like and has a function of flying autonomously.

For example, image data taken by the camera 6502 is stored in an electronic component 6504. The electronic component 6504 can analyze the image data to detect whether there are obstacles when the flying object moves. An imaging device with a plurality of kinds of systems may be used as the camera 6502. The camera 6502 can be used as the imaging device included in the monitoring system according to one embodiment of the present invention. In addition, when the neural network portion makes estimation based on data obtained by the camera 6502, the suspicious person can be identified from information obtained by imaging through colorization or super-resolution processing.

The composition, structure, method, and the like described in this embodiment can be used in combination as appropriate with the compositions, structures, methods, and the like described in the other embodiments and the like.

REFERENCE NUMERALS

10: data acquisition device, 11: solid-state imaging element, 12: analog arithmetic circuit, 13: A/D circuit, 14: memory portion, 15: large-scale storage device, 16: neural network portion, 17: time information acquisition device, 18: storage portion, 19: display portion, 20: image processing device, 21: imaging system, 100: pixel, 101: photoelectric conversion device, 102: transistor, 103: transistor, 104: transistor, 105: transistor, 106: transistor, 107: capacitor, 111: wiring, 112: wiring, 113a: wiring, 113f: wiring, 114: wiring, 115: wiring, 117: wiring, 121: wiring, 122: wiring, 123: wiring, 124: wiring, 150: transistor, 150g: transistor, 150h: transistor, 150i: transistor, 150j: transistor, 200: pixel block, 201: circuit, 202: capacitor, 203: transistor, 204: transistor, 205: transistor, 206: transistor, 207: resistor, 211: wiring, 212: wiring, 213: wiring, 215: wiring, 216: wiring, 217: wiring, 218: wiring, 219: wiring, 300: pixel array, 301: circuit, 302: circuit, 303: circuit, 304: circuit, 305: circuit, 306: circuit, 311: wiring, 951: housing, 952: lens, 953: support portion, 954: support base, 955: camera unit, 956: protective cover, 6500: flying object, 6501: propeller, 6502: camera, 6503: battery, and 6504: electronic component.

The invention claimed is:

1. An imaging system comprising:
a solid-state imaging element without a color filter;
a storage device; and
a learning device,
wherein the solid-state imaging element acquires monochrome image data,
wherein the learning device performs colorization of the monochrome image data using training data stored in the storage device to create colored image data, and
wherein the training data used in the learning device includes a color picture image and a color animation image.

2. The imaging system according to claim 1, wherein super-resolution processing is performed on the monochrome image data at least once.

3. The imaging system according to claim 1, wherein super-resolution processing is performed on the training data at least once.

4. The imaging system according to claim 1, wherein the monochrome image data is analog data and the colored image data is digital data.

5. A monitoring system comprising a security camera,
wherein the security camera includes a solid-state imaging element without a color filter, a learning device, and a storage device,
wherein the solid-state imaging element performs imaging while the security camera senses a person, and a software program for creating colored image data by inference of the learning device is executed using training data of the storage device, and
wherein the training data used in the learning device includes a color picture image and a color animation image.

6. The monitoring system according to claim, 5, wherein the colored image data is digital data.

* * * * *